US012574580B2

(12) United States Patent
Liu et al.

(10) Patent No.: US 12,574,580 B2
(45) Date of Patent: Mar. 10, 2026

(54) DATA DEDUPLICATION METHOD AND APPARATUS, AND STORAGE MEDIUM

(71) Applicant: Beijing Bytedance Network Technology Co., Ltd., Shijingshan District (CN)

(72) Inventors: Tianyi Liu, Beijing (CN); Jujun You, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 139 days.

(21) Appl. No.: 18/570,012

(22) PCT Filed: Aug. 22, 2022

(86) PCT No.: PCT/CN2022/114055
§ 371 (c)(1),
(2) Date: Dec. 13, 2023

(87) PCT Pub. No.: WO2023/071467
PCT Pub. Date: May 4, 2023

(65) Prior Publication Data
US 2024/0283993 A1 Aug. 22, 2024

(30) Foreign Application Priority Data
Oct. 25, 2021 (CN) .......................... 202111240126.2

(51) Int. Cl.
*H04N 21/2662* (2011.01)
*H04N 21/2187* (2011.01)
(Continued)

(52) U.S. Cl.
CPC ..... *H04N 21/2662* (2013.01); *H04N 21/2187* (2013.01); *H04N 21/233* (2013.01); *H04N 21/234* (2013.01); *H04N 21/8547* (2013.01)

(58) Field of Classification Search
CPC ........... H04N 21/2662; H04N 21/2187; H04N 21/233; H04N 21/234; H04N 21/8547; H04N 21/439; H04N 21/44
(Continued)

(56) References Cited

U.S. PATENT DOCUMENTS 8,055,779 B1 11/2011 Cheng et al.
2012/0076143 A1* 3/2012 Liu ..................... H04L 12/1868
370/390
(Continued)

FOREIGN PATENT DOCUMENTS

CN 106507217 A 3/2017
CN 108377427 A 8/2018
(Continued)

OTHER PUBLICATIONS

China National Intellectual Property Administration, Office Action and Search Report Issued in Application No. 202111240126.2, Jun. 6, 2023, 9 pages.
(Continued)

*Primary Examiner* — Adil Ocak
(74) *Attorney, Agent, or Firm* — Alleman Hall LLP

(57) ABSTRACT

A data deduplication method includes: acquiring a live streaming data stream to be processed, wherein the data stream includes at least one audio/video packet; and executing following operations on one audio/video packet, each audio/video packet carrying an identifier, and the identifier being determined according to the order of the audio/video packet in the live streaming data stream; determining, according to the identifier of the audio/video packet, whether the audio/video packet is a repeatedly acquired audio/video packet, and if so, discarding the audio/video packet. Accordingly, it is ensured that no unduplicated data is sent to a user, and the problem that in a live streaming
(Continued)

process, due to the fact that an intermediate link is reconnected, a user acquired part of duplicated data, and the audio/video rollback phenomenon caused by the duplicated data being played is solved.

18 Claims, 7 Drawing Sheets

(51) Int. Cl.
*H04N 21/233* (2011.01)
*H04N 21/234* (2011.01)
*H04N 21/8547* (2011.01)

(58) Field of Classification Search
USPC ......................................................... 725/114
See application file for complete search history.

(56) References Cited

U.S. PATENT DOCUMENTS

| | | | | | |
|---|---|---|---|---|---|
| 2014/0351638 | A1 * | 11/2014 | Chang | ................... | H04L 1/0002 |
| | | | | | 714/18 |
| 2019/0364303 | A1 | 11/2019 | Zhu | | |

FOREIGN PATENT DOCUMENTS

| | | | | | |
|---|---|---|---|---|---|
| CN | 110650087 | A | 1/2020 | | |
| CN | 111263240 | A | 6/2020 | | |
| CN | 111328028 | A | 6/2020 | | |
| CN | 111385049 | A | 7/2020 | | |
| CN | 111669438 | A | 9/2020 | | |
| CN | 111769915 | A | 10/2020 | | |
| CN | 112261418 | A | 1/2021 | | |
| CN | 113259256 | A | 8/2021 | | |
| CN | 113423018 | A | 9/2021 | | |
| CN | 113973215 | A | 1/2022 | | |
| EP | 1461950 | B1 * | 3/2016 | ......... | H04N 21/4344 |
| WO | 2021164532 | A1 | 8/2021 | | |

OTHER PUBLICATIONS

ISA China National Intellectual Property Administration, International Search Report and Written Opinion Issued in Application No. PCT/CN2022/114055, Nov. 23, 2022, WIPO, 11 pages.

\* cited by examiner

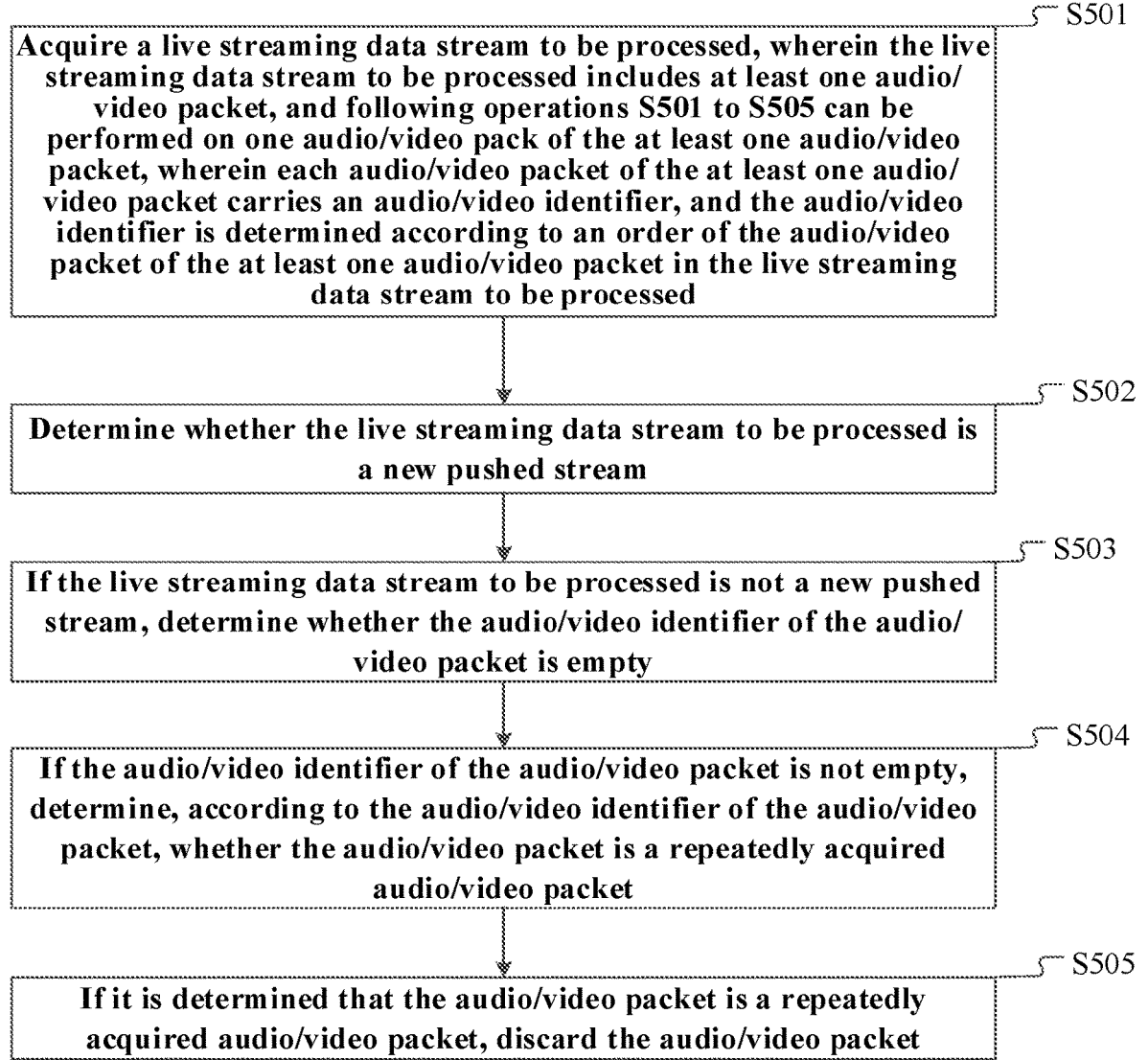

Acquire a live streaming data stream to be processed, wherein the live streaming data stream to be processed includes at least one audio/video packet, and following operations S501 to S505 can be performed on one audio/video pack of the at least one audio/video packet, wherein each audio/video packet of the at least one audio/video packet carries an audio/video identifier, and the audio/video identifier is determined according to an order of the audio/video packet of the at least one audio/video packet in the live streaming data stream to be processed

S501

Determine whether the live streaming data stream to be processed is a new pushed stream

S502

If the live streaming data stream to be processed is not a new pushed stream, determine whether the audio/video identifier of the audio/video packet is empty

S503

If the audio/video identifier of the audio/video packet is not empty, determine, according to the audio/video identifier of the audio/video packet, whether the audio/video packet is a repeatedly acquired audio/video packet

S504

If it is determined that the audio/video packet is a repeatedly acquired audio/video packet, discard the audio/video packet

DATA DEDUPLICATION METHOD AND APPARATUS, AND STORAGE MEDIUM

CROSS-REFERENCE TO RELATED APPLICATIONS

The present disclosure is a U.S. National Stage Application of PCT Application Serial No. PCT/CN2022/114055, filed Aug. 22, 2022, which claims priority to Chinese Patent Application No. 202111240126.2, filed with the China National Intellectual Property Administration on Oct. 25, 2021 and entitled "DATA DEDUPLICATION METHOD AND APPARATUS, AND STORAGE MEDIUM", the disclosures of which are incorporated herein by reference in their entireties.

FIELD

The present disclosure relates to the technical field of Internet, and in particular, to a data deduplication method and apparatus, a stream pulling device, a storage medium, a computer program product, and a computer program.

BACKGROUND

With the development of an Internet technology and the increasing demand of people for interactions, online live streaming has become a common intercommunication way for people to exchange information and communicate.

At present, a user can apply to become a live streamer on a live streaming platform and share live streaming data streams with other users. For example, a live streamer uploads a corresponding live streaming data stream to a live streaming server through a stream pushing device, and another user pulls a stream from the live streaming server through a stream pulling device to acquire the corresponding live streaming data stream. Therefore, information shared by the live streamer can be viewed on a terminal.

However, current online live streaming methods are no longer limited to indoor live streaming, but also include outdoor live streaming and mobile live streaming. In this way, at outdoors or in a moving state, there is an unsteady network. In a live streaming process, some links between the stream pulling device and the live streaming server are disconnected and then reconnected. Due to a quick-start mode of the live streaming server, a part of cached data would eventually be sent to the stream pulling device. In this scenario, data acquired by the stream pulling device may include some duplicated data, and a user may acquire the duplicated data. Audio/video rollback would occur during playing of the duplicated data, which affects the viewing experience of the user.

SUMMARY

In order to solve the problems in the existing technology, the present disclosure provides a data deduplication method and apparatus, a stream pulling device, a storage medium, a computer program product, and a computer program.

In a first aspect, the embodiments of the present disclosure provide a data deduplication method, including:

acquiring a live streaming data stream to be processed, wherein the live streaming data stream to be processed includes at least one audio/video packet; and performing following operations on one audio/video pack of the at least one audio/video packets, wherein an audio/video packet of the at least one audio/video packet carries an audio/video identifier, and the audio/video identifier is determined according to an order of the audio/video packet of the at least one audio/video packet in the live streaming data stream to be processed:

determining, according to the audio/video identifier of one audio/video packet of the at least one audio/video packet, whether the one audio/video packet of the at least one audio/video packet is a repeatedly acquired audio/video packet; and if it is determined that the one audio/video packet of the at least one audio/video packet is a repeatedly acquired audio/video packet, discarding the one audio/video packet of the at least one audio/video packet.

In a possible implementation, the determining whether the audio/video packet of the at least one audio/video packet is a repeatedly acquired audio/video packet according to the audio/video identifier of one audio/video packet of the at least one audio/video packet includes:

determining whether the audio/video packets in the acquired live streaming data stream to be processed include an audio/video packet having the same audio/video identifier as the audio/video identifier of one audio/video packet of the at least one audio/video packet; and if the audio/video packets in the acquired live streaming data stream to be processed include an audio/video packet having the same audio/video identifier as the audio/video identifier of the one audio/video packet of the at least one audio/video packet, determining that the one audio/video packet of the at least one audio/video packet is a repeatedly acquired audio/video packet.

In a possible implementation, before determining that the one audio/video packet of the at least one audio/video packet is a repeatedly acquired audio/video packet, the method further includes:

determining whether the audio/video identifier of one audio/video packet of the at least one audio/video packet is an audio/video identifier that is reset after the audio/video identifiers of the audio/video packets in the live streaming data stream to be processed reach a preset end identifier; and the determining that the one audio/video packet of the at least one audio/video packet is a repeatedly acquired audio/video packet includes:

if the audio/video identifier of one audio/video packet of the at least one audio/video packet is not an audio/video identifier that is reset after the audio/video identifiers of the audio/video packets in the live streaming data stream to be processed reach the preset end identifier, determining that the one audio/video packet of the at least one audio/video packet is a repeatedly acquired audio/video packet.

In a possible implementation, the audio/video identifiers of the audio/video packets of the at least one audio/video packet monotonically increase according to the order of the audio/video packets of the at least one audio/video packet in the live streaming data stream to be processed;

the determining whether the acquired audio/video packets in the live streaming data stream to be processed include an audio/video packet having the same audio/video identifier as the audio/video identifier of one audio/video packet of the at least one audio/video packet includes:

determining a maximum audio/video identifier of the acquired audio/video packets according to the audio/video packets of the acquired live streaming data stream to be processed;

determining whether the audio/video identifier of one audio/video packet of the at least one audio/video packet is less than or equal to the maximum audio/video identifier of the acquired audio/video packets; and if the audio/video identifier of one audio/video packet of the at least one audio/video packet is less than or equal to the maximum audio/video identifier of the acquired audio/video packets, determining that the acquired audio/video packets in the live streaming data stream to be processed include an audio/video packet having the same audio/video identifier as the audio/video identifier of one audio/video packet of the at least one audio/video packet.

In a possible implementation, the audio/video identifier of one audio/video packet of the at least one audio/video packet monotonically increases according to the order of the audio/video packet of the at least one audio/video packet in the live streaming data stream to be processed;

the determining whether the audio/video identifier of one audio/video packet of the at least one audio/video packet is an audio/video identifier that is reset after the audio/video identifiers of the audio/video packets in the live streaming data stream to be processed reach a preset end identifier includes:

acquiring the audio/video identifier of a first audio/video packet at an interval of a preset number of audio/video packets in a first preset direction from one audio/video packet of the at least one audio/video packet in the live streaming data stream to be processed, and the audio/video identifier of a second audio/video packet at an interval of the preset number of audio/video packets in a second preset direction of one audio/video packet of the at least one audio/video packet in the live streaming data stream to be processed, wherein the second preset direction and the first preset direction are opposite; and if the audio/video identifier of the first audio/video packet is greater than or equal to the audio/video identifier of the second audio/video packet, determining that the audio/video identifier of one audio/video packet of the at least one audio/video packet is an audio/video identifier that is reset after the audio/video identifiers of the audio/video packets in the live streaming data stream to be processed reach the preset end identifier.

In a possible implementation, before the determining, according to the audio/video identifier of one audio/video packet of the at least one audio/video packet, whether the audio/video packet of the at least one audio/video packet is a repeatedly acquired audio/video packet, the method further includes:

determining whether the live streaming data stream to be processed is a new pushed stream; and the determining, according to the audio/video identifier of one audio/video packet of the at least one audio/video packet, whether the audio/video packet of the at least one audio/video packet is a repeatedly acquired audio/video packet includes:

if the live streaming data stream to be processed is not a new pushed stream, determining, according to the audio/video identifier of one audio/video packet of the at least one audio/video packet, whether the audio/video packet of the at least one audio/video packet is a repeatedly acquired audio/video packet.

In a possible implementation, the live streaming data stream to be processed carries a stream pushing timestamp;

the determining whether the live streaming data stream to be processed is a new pushed stream includes:

determining, according to the stream pushing timestamp, whether the stream pushing timestamp changes; and if it is determined that the stream pushing timestamp changes, determining that the live streaming data stream to be processed is a new pushed stream.

In a possible implementation, before the determining, according to the audio/video identifier of one audio/video packet of the at least one audio/video packet, whether the audio/video packet of the at least one audio/video packet is a repeatedly acquired audio/video packet, the method further includes:

determining whether the audio/video identifier of one audio/video packet of the at least one audio/video packet is empty; and the determining, according to the audio/video identifier of one audio/video packet of the at least one audio/video packet, whether the audio/video packet of the at least one audio/video packet is a repeatedly acquired audio/video packet includes:

if the audio/video identifier of one audio/video packet of the at least one audio/video packet is not empty, determining, according to the audio/video identifier of one audio/video packet of the at least one audio/video packet, whether the audio/video packet of the at least one audio/video packet is a repeatedly acquired audio/video packet.

In a possible implementation, after the determining, according to the audio/video identifier of one audio/video packet of the at least one audio/video packet, whether the audio/video packet of the at least one audio/video packet is a repeatedly acquired audio/video packet, the method further includes:

if it is determined that the audio/video packet of the at least one audio/video packet is not a repeatedly acquired audio/video packet, recording the audio/video identifier of the audio/video packet of the at least one audio/video packet, and removing the audio/video identifier of one audio/video packet of the at least one audio/video packet after recording the audio/video identifier of the audio/video packet of the at least one audio/video packet, so that a terminal performs audio/video playing on the basis of one audio/video packet of the at least one audio/video packet with the audio/video identifier removed.

In a second aspect, the embodiments of the present disclosure provide a data deduplication apparatus, including:

an acquisition module, configured to: acquire a live streaming data stream to be processed, wherein the live streaming data stream to be processed includes at least one audio/video packet; and perform following operations on one audio/video pack of the at least one audio/video packets, wherein each audio/video packet of the at least one audio/video packet carries an audio/video identifier, and the audio/video identifier is determined according to an order of the audio/video packet of the at least one audio/video packet in the live streaming data stream to be processed:

a first determining module, configured to determine, according to the audio/video identifier of one audio/video packet of the at least one audio/video packet, whether the audio/video packet of the at least one audio/video packet is a repeatedly acquired audio/video packet; and a processing module, configured to: if it is determined that the audio/video packet of the at least one audio/video packet is a repeatedly acquired audio/video packet, discard the audio/video packet of the at least one audio/video packet.

In a possible implementation, the first determining module is specifically configured to:

determine whether the acquired audio/video packets in the live streaming data stream to be processed include an audio/video packet having the same audio/video identifier as the audio/video identifier of one audio/video packet of the at least one audio/video packet; and if the acquired audio/video packets in the live streaming data stream to be processed include an audio/video packet having the same audio/video identifier as the audio/video identifier of one audio/video packet of the at least one audio/video packet, determine that the audio/video packet of the at least one audio/video packet is a repeatedly acquired audio/video packet.

In a possible implementation, the first determining module is further configured to:

determine whether the audio/video identifier of one audio/video packet of the at least one audio/video packet is an audio/video identifier that is reset after the audio/video identifiers of the audio/video packets in the live streaming data stream to be processed reach a preset end identifier; and if the audio/video identifier of one audio/video packet of the at least one audio/video packet is not an audio/video identifier that is reset after the audio/video identifiers of the audio/video packets in the live streaming data stream to be processed reach the preset end identifier, determine that the audio/video packet of the at least one audio/video packet is a repeatedly acquired audio/video packet.

In a possible implementation, the audio/video identifiers of the audio/video packets of the at least one audio/video packet monotonically increase according to the order of the audio/video packets of the at least one audio/video packet in the live streaming data stream to be processed;

the first determining module is specifically configured to:

determine a maximum audio/video identifier of the acquired audio/video packets according to the audio/video packets of the acquired live streaming data stream to be processed;

determine whether the audio/video identifier of one audio/video packet of the at least one audio/video packet is less than or equal to the maximum audio/video identifier of the acquired audio/video packets; and if the audio/video identifier of one audio/video packet of the at least one audio/video packet is less than or equal to the maximum audio/video identifier of the acquired audio/video packets, determine that the acquired audio/video packets in the live streaming data stream to be processed include an audio/video packet having the same audio/video identifier as the audio/video identifier of one audio/video packet of the at least one audio/video packet.

In a possible implementation, the audio/video identifier of one audio/video packet of the at least one audio/video packet monotonically increases according to the order of the audio/video packet of the at least one audio/video packet in the live streaming data stream to be processed;

the first determining module is specifically configured to:

acquire the audio/video identifier of a first audio/video packet at an interval of a preset number of audio/video packets in a first preset direction from one audio/video packet of the at least one audio/video packet in the live streaming data stream to be processed, and the audio/video identifier of a second audio/video packet at an interval of the preset number of audio/video packets in a second preset direction of one audio/video packet of the at least one audio/video packet in the live streaming data stream to be processed, wherein the second preset direction and the first preset direction are opposite; and if the audio/video identifier of the first audio/video packet is greater than or equal to the audio/video identifier of the second audio/video packet, determine that the audio/video identifier of one audio/video packet of the at least one audio/video packet is an audio/video identifier that is reset after the audio/video identifiers of the audio/video packets in the live streaming data stream to be processed reach the preset end identifier.

In a possible implementation, the apparatus further includes a second determining module, configured to: before the first determining module determines, according to the audio/video identifier of one audio/video packet of the at least one audio/video packet, whether the audio/video packet of the at least one audio/video packet is a repeatedly acquired audio/video packet, determine whether the live streaming data stream to be processed is a new pushed stream; and the first determining module is specifically configured to:

if the live streaming data stream to be processed is not a new pushed stream, determine, according to the audio/video identifier of one audio/video packet of the at least one audio/video packet, whether the audio/video packet of the at least one audio/video packet is a repeatedly acquired audio/video packet.

In a possible implementation, the live streaming data stream to be processed carries a stream pushing timestamp;

the second determining module is specifically configured to:

determine, according to the stream pushing timestamp, whether the stream pushing timestamp changes; and if it is determined that the stream pushing timestamp changes, determine that the live streaming data stream to be processed is a new pushed stream.

In a possible implementation, the apparatus further includes a third determining module, configured to: before the first determining module determines, according to the audio/video identifier of one audio/video packet of the at least one audio/video packet, whether the audio/video packet of the at least one audio/video packet is a repeatedly acquired audio/video packet, determine whether the audio/video identifier of one audio/video packet of the at least one audio/video packet is empty; and the first determining module is specifically configured to:

if the audio/video identifier of one audio/video packet of the at least one audio/video packet is not empty, determine, according to the audio/video identifier of one audio/video packet of the at least one audio/video packet, whether the audio/video packet of the at least one audio/video packet is a repeatedly acquired audio/video packet.

In a possible implementation, the processing module is further configured to:

if it is determined that the audio/video packet of the at least one audio/video packet is not a repeatedly acquired audio/video packet, record the audio/video identifier of the audio/video packet of the at least one audio/video packet, and remove the audio/video identifier of one audio/video packet of the at least one audio/video packet after recording the audio/video identifier of the audio/video packet of the at least one audio/video packet, so that a terminal performs audio/video playing on the basis of one audio/video packet of the at least one audio/video packet with the audio/video identifier removed.

In a third aspect, the embodiments of the present disclosure provide a stream pulling device, including:

a processor;

a memory; and a computer program, wherein the computer program is stored in the memory and is configured to be executed by the processor, and the computer program includes instructions used for performing the method as described in the first aspect.

In a fourth aspect, the embodiments of the present disclosure provide a computer-readable storage medium, wherein the computer-readable storage medium stores a computer program, and when a processor executes the computer program, the processor is caused to perform the method as described in the first aspect.

In a fifth aspect, the embodiments of the present disclosure provide a computer program product, including computer instructions. The computer instructions, when executed by a processor, implement the method as described in the first aspect.

In a sixth aspect, the embodiments of the present disclosure provide a computer program. The computer program is configured to implement the method as described in the first aspect.

The present disclosure provides a data deduplication method and apparatus, a stream pulling device, a storage medium, a computer program product, and a computer program. The method includes: acquiring a live streaming data stream to be processed, wherein the live streaming data stream to be processed includes at least one audio/video packet, wherein the following operations can be performed on one audio/video pack among the audio/video packets; the audio/video packet carries an audio/video identifier, and the audio/video identifier is determined according to an order of the audio/video packet in the live streaming data stream: determining, according to the audio/video identifier of the audio/video packet, whether the audio/video packet is a repeatedly acquired audio/video packet, and if it is determined that the audio/video packet is a repeatedly acquired audio/video packet, discarding the audio/video packet. According to the embodiments of the present disclosure, each audio/video packet is uniquely marked with an audio/video identifier, so that repeated audio/video data is determined and discarded by means of audio/video identifiers of audio/video packets, it is ensured that data sent to a user is unduplicated data, and the problem of audio/video rollback caused by playing of duplicated data due to the following reason is solved: In a live streaming process, reconnection of an intermediate link causes a user to acquire some duplicated data.

BRIEF DESCRIPTION OF THE DRAWINGS

To describe the technical solutions in the embodiments of the present disclosure or in the existing technology more clearly, the following briefly introduces the accompanying drawings for describing the embodiments or the existing technology. Apparently, the accompanying drawings in the following description show merely some embodiments of the present disclosure, and a person of ordinary skill in the art may still derive other drawings from the accompanying drawings without creative efforts.

FIG. 5 is a flowchart of another data deduplication method according to an embodiment of the present disclosure;

DETAILED DESCRIPTION OF EMBODIMENTS

The technical solutions in the embodiments of present disclosure are clearly and completely described below with reference to the accompanying drawings in the embodiments of present disclosure. Apparently, the described embodiments are merely some rather than all of the embodiments of present disclosure. All other embodiments obtained by a person of ordinary skill in the art based on the embodiments of the present disclosure without making creative efforts shall fall within the protection scope of the present disclosure.

The terms such as "first", "second", "third", and "fourth" (if any) in this specification, the claims, and the foregoing accompanying drawings of the present disclosure are intended to distinguish between similar objects rather than describe a particular sequence or a chronological order. It should be understood that such used data is interchangeable where appropriate, so that the embodiments of the present disclosure described here can be implemented in an order other than those illustrated or described here. In addition, the terms "include" and "have", as well as any variations thereof, are intended to cover non-exclusive inclusion. For example, a process, method, system, product, or equipment that includes a series of steps or units does not need to be limited to those clearly listed steps or units, but may include other steps or units not clearly listed or inherent to these processes, methods, products, or equipment.

With the perfection of network infrastructures and the upgrading of terminal hardware, live streaming has become a popular interaction way.

Figure 1:
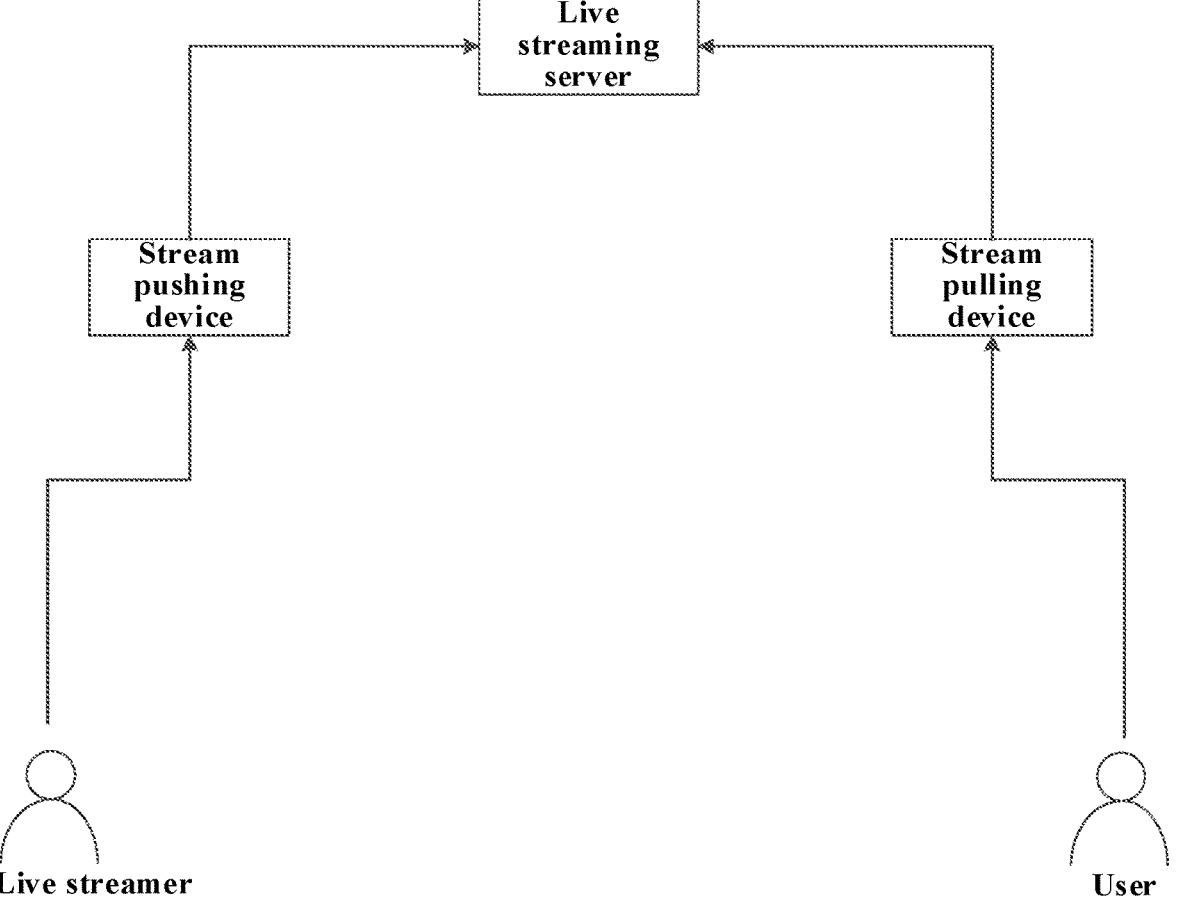
FIG. 1 is a schematic diagram of a live streaming architecture according to an embodiment of the present disclosure.

In the related technology, as shown in FIG. 1, in a live streaming Content Delivery Network (CDN), a live streamer uploads a corresponding live streaming data stream to a live streaming server through a stream pushing device, and another user pulls a stream from the live streaming server through a stream pulling device to acquire the corresponding live streaming data stream. When a user pulls a stream to the stream pulling device, the stream pulling device returns a source to the live streaming server. In this process, if some links between the stream pulling device and the live streaming server are disconnected and then reconnected, due to a quick-start mode of the live streaming server, a part of cached data would eventually be sent to the stream pulling device. In this way, the stream pulling device may acquire some duplicated data, and audio/video rollback would occur when the user plays the duplicated data, which affects the viewing experience of the user.

In order to solve the above problems, the embodiments of the present disclosure provide a data deduplication method. Each audio/video packet is uniquely marked with an audio/video identifier, so that duplicated audio/video data is determined and discarded by means of audio/video identifiers of audio/video packets in a live streaming data stream, it is ensured that data sent to a user is unduplicated data, and the problem of audio/video rollback caused by playing of duplicated data due to the following reason is solved: In a live streaming process, reconnection of an intermediate link causes a user to acquire some duplicated data.

Figure 2:
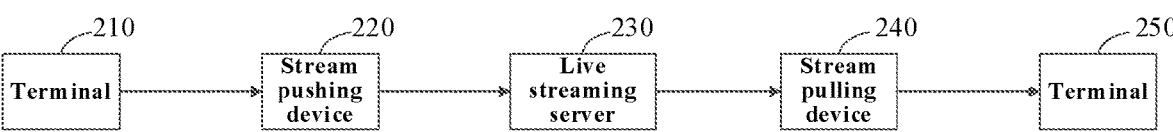
FIG. 2 is a diagram of an application environment of operation of a data deduplication method according to an embodiment of the present disclosure.

Optionally, FIG. 2 is a diagram of an application environment of operation of a data deduplication method according to an embodiment of the present disclosure. FIG. 2 only describes a possible application environment of the data deduplication method provided by the embodiments of the present disclosure in an exemplary manner, and the application environment of the data deduplication method provided by the embodiments of the present disclosure is not limited to the application environment shown in FIG. 2.

As shown in FIG. 2, live streaming including one live streamer and one user is taken as an example. The above application environment can include a terminal 210, a stream pushing device 220, a live streaming server 230, a stream pulling device 240, and a terminal 250. The terminal 210 can communicate with the stream pushing device 220. Both the stream pushing device 220 and the stream pulling device 240 can communicate with the live streaming server 230, and the terminal 250 can communicate with the stream pulling device 240.

The terminal 210 and the terminal 250 may be, but are not limited to, smartphones, tablets, laptops, desktop computers, and the like. The terminal 210 may be a terminal device used by the live streamer. The terminal device may include video live streaming software and a microphone used for receiving and recording a voice of the user. The terminal 210 can upload a live streaming data stream to the live streaming server 230 through the stream pushing device 220, and the live streaming data stream includes at least one audio/video packet, wherein following operations are performed on one audio/video pack of the at least one audio/video packet, wherein each audio/video packet of the at least one audio/video packet carries an audio/video identifier, and the audio/video identifier is determined according to an order of the audio/video packet in the live streaming data stream: determining and discarding duplicated audio/video data according to the audio/video identifier of the audio/video packet. The live streaming server 230 receives the live streaming data stream uploaded by the terminal 210. The terminal 250 can be a terminal device used by the user. The terminal device may include video live streaming software and a microphone used for receiving and recording a voice of the user. The terminal 250 may acquire data from the stream pulling device 240, such as the live streaming data stream uploaded by the terminal 210, and play the live streaming data stream.

In order to avoid the problem of audio/video rollback caused by playing of duplicated data due to the following reason: in a live streaming process, reconnection of an intermediate link causes the user to acquire some duplicated data, the stream pulling device 240 can determine and discard the duplicated audio/video data through the audio/video identifier of the audio/video packet, which ensures that data sent to the terminal 250 is unduplicated data.

In addition, the stream pulling device 240 may include a processor, a graphics processing unit, a storage medium, an internal memory, a network interface, a display screen, a speaker, and an input device including a microphone, which are connected through a system bus. A storage medium of the stream pulling device 240 stores an operating system, and further includes a data deduplication system. The data deduplication system is configured to implement a data deduplication method. The processor is configured to provide computing and control capabilities to support the operation of the entire stream pulling device 240. The graphics processing unit in the stream pulling device 240 is configured to at least provide drawing of video images, such as drawing of live streaming images. The internal memory provides an environment for the operation of the data deduplication system in the storage medium. The network interface is used for network communication with the live streaming server 230, such as acquiring the live streaming data stream uploaded by the terminal 210. The display screen is configured to display videos, such as a live streaming video image. The speaker is used for playing audios, such as a voice of the connected live streamer and a voice of the connected user. The input device is configured to receive commands or data input by the user, and the input device includes the microphone used for receiving a voice input by the user.

Several embodiments will be used as examples to describe the technical solutions of the present disclosure below, and identical or similar concepts or processes may not be described in detail in some embodiments.

Figure 3:
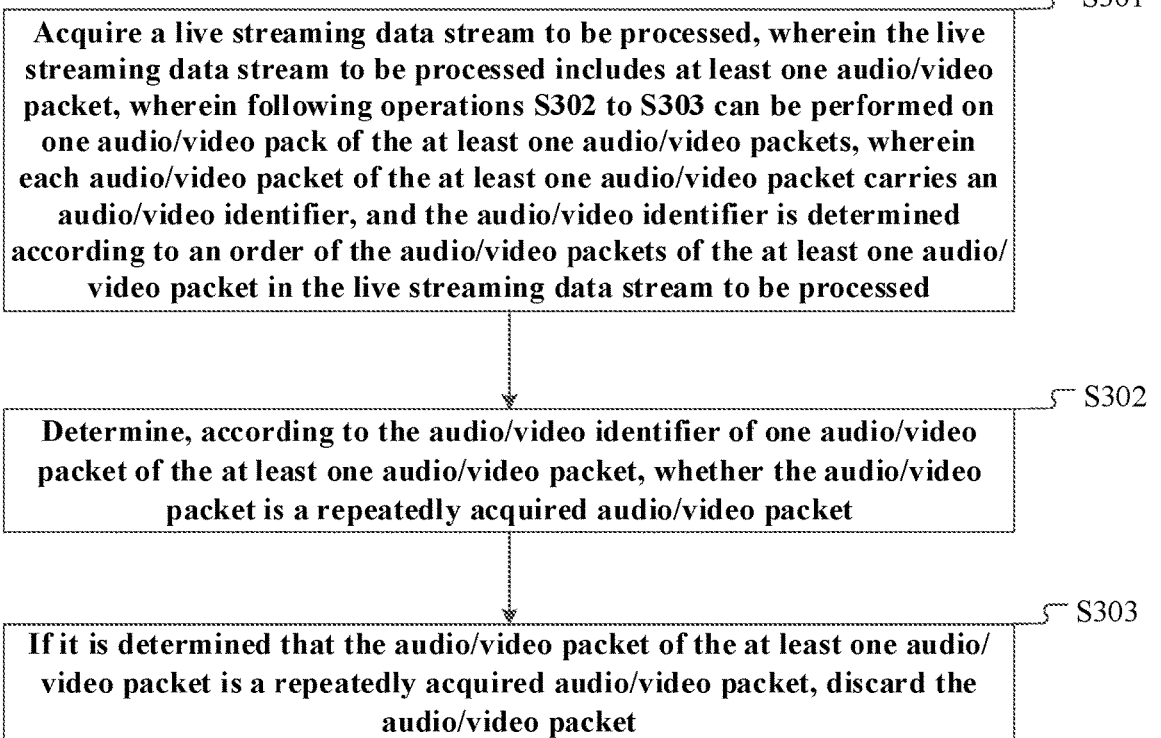
FIG. 3 is a flowchart of a data deduplication method according to an embodiment of the present disclosure.

FIG. 3 is a flowchart of a data deduplication method according to an embodiment of the present disclosure. An executive body of this embodiment can be the stream pulling device in FIG. 2, and a specific executive body can be determined according to an actual application scenario. This embodiment of the present disclosure will not particularly limit this. As shown in FIG. 3, the data deduplication method provided by this embodiment of the present disclosure can include the following steps:

S301: A live streaming data stream to be processed is acquired, wherein the live streaming data stream to be processed includes at least one audio/video packet, and following operations S302 to S303 can be performed on one audio/video pack of the at least one audio/video packet, wherein each audio/video packet of the at least one audio/video packet carries an audio/video identifier, and the audio/video identifier is determined according to an order of the audio/video packet of the at least one audio/video packet in the live streaming data stream to be processed.

The stream pulling device described above can perform the following operations S302-S303 on each audio/video packet of the at least one audio/video packet described above, to solve the problem of audio/video rollback caused by playing of duplicated data due to the following reason: In a live streaming process, reconnection of an intermediate link causes a user to acquire some duplicated data. The live streaming data stream to be processed can be determined according to an actual situation, such as the above live streaming data stream in the live streaming CDN architecture shown in FIG. 1. The live streaming data stream to be processed can include one or more audio/video packets, and each audio/video packet carries an audio/video identifier.

The audio/video identifier is used for uniquely marking each audio/video packet. For example, the audio/video identifier can be a packet number.

Exemplarily, the stream pulling device described above acquires a live streaming data stream to be processed from a live streaming server, and the live streaming data stream to be processed can be a live streaming data stream uploaded by the live streamer to the live streaming server through a stream pushing device. The stream pushing device or the live streaming server marks each audio/video packet with an audio/video identifier on a streaming media format (Flash Video, Flv) tag. After the marking, the identifier of the audio/video packet remains unchanged during transmission. Therefore, the stream pulling device can determine and discard duplicated audio/video data according to the identifiers of the audio/video packets, and the problem of sending duplicated audio/video data to a user due to reconnection of an intermediate link.

In addition, the audio/video identifiers carried by the audio/video packets described above can be determined according to an order of the audio/video packet in the live streaming data stream to be processed, for example, the audio/video identifiers monotonically increase according to the order of the audio/video packets in the live streaming data stream to be processed. Exemplarily, the stream pushing device or live streaming server writes monotonically increasing packet numbers to the audio/video packets on the Flv tag according to the order of the audio/video packets in the live streaming data stream to be processed, starting from packet number 1.

Besides, in order to prevent the audio/video identifiers of the audio/video packets of the at least one audio/video packet from being increased infinitely according to their order to cause difficulty in management, the stream pushing device or live streaming server can set an end identifier in advance. For example, starting from packet number 1 is taken as an example. The end identifier can be packet number 100, packet number 1000, or the like, which can be determined according to an actual need. In this way, the stream pushing device or the live streaming server can reset audio/video identifiers when the audio/video identifier of an audio/video packet reaches the end identifier. For example, starting with packet number 1 and ending with packet number 100, when a packet number reaches 100, monotonically increasing serial numbers starting with 1 are reset, to facilitate the management.

S302: Whether the audio/video packet is a repeatedly acquired audio/video packet is determined according to the audio/video identifier of one audio/video packet of the at least one audio/video packet.

Exemplarily, after acquiring the live streaming data stream to be processed, the stream pulling device can determine whether the acquired audio/video packets in the live streaming data stream to be processed include an audio/video packet having the same audio/video identifier as the audio/video identifier of one audio/video packet of the at least one audio/video packet. If the acquired audio/video packets in the live streaming data stream to be processed include an audio/video packet having the same audio/video identifier as the audio/video identifier of the audio/video packet, the stream pulling device can determine that the audio/video packet is a repeatedly acquired audio/video packet. If the acquired audio/video packets in the live streaming data stream to be processed do not include an audio/video packet having the same audio/video identifier as the audio/video identifier of the audio/video packet, the stream pulling device can determine that the audio/video packet is not a repeatedly acquired audio/video packet.

For example, the audio/video identifiers of the audio/video packets of the at least one audio/video packet monotonically increase according to the order of the audio/video packets in the live streaming data stream to be processed, which is as an example. The stream pulling device can determine a maximum audio/video identifier of the acquired audio/video packets according to the audio/video packets of the acquired live streaming data stream to be processed, and then determine whether the audio/video identifier of one audio/video packet of the at least one audio/video packet is less than or equal to the maximum audio/video identifier of the acquired audio/video packets. If the audio/video identifier of the audio/video packet is less than or equal to the maximum audio/video identifier of the acquired audio/video packets, the stream pulling device can determine that the acquired audio/video packets in the live streaming data stream to be processed include an audio/video packet having the same audio/video identifier as the audio/video identifier of the audio/video packet, and the audio/video packet described above is a repeatedly acquired audio/video packet. If the audio/video identifier of the audio/video packet is greater than the maximum audio/video identifier of the acquired audio/video packets, the stream pulling device can determine that the acquired audio/video packets in the live streaming data stream to be processed do not include an audio/video packet having the same audio/video identifier as the audio/video identifier of the audio/video packet, and the audio/video packet described above is not a repeatedly acquired audio/video packet.

Considering a situation where the stream pulling device or live streaming server resets the audio/video identifiers when the audio/video identifier of an audio/video packet reaches the end identifier, in order to improve the accuracy of determination of duplicated data, before the determining that one audio/video packet of the at least one audio/video packet is a repeatedly acquired audio/video packet, the stream pulling device can also determine whether the audio/video identifier of the audio/video packet is an audio/video identifier that is reset after the audio/video identifiers of the audio/video packets in the live streaming data stream to be processed reach a preset end identifier. If the audio/video identifier of the audio/video packet is not an audio/video identifier that is reset after the audio/video identifiers of the audio/video packets in the live streaming data stream to be processed reach the preset end identifier, the stream pulling device determines that the audio/video packet is a repeatedly acquired audio/video packet.

That is, when the stream pulling device determines whether the audio/video packet is a repeatedly acquired audio/video packet according to the audio/video identifier of one audio/video packet of the at least one audio/video packet, the stream pulling device can first determine whether the acquired audio/video packets in the live streaming data stream include an audio/video packet having the same audio/video identifier as the audio/video identifier of the audio/video packet described above, and further determine, if so, whether the audio/video identifier of the audio/video packet described above is an audio/video identifier that is reset after the audio/video identifiers of the audio/video packets in the live streaming data stream to be processed reach the preset end identifier, and determine, if no, that the audio/video packet described above is a repeatedly acquired audio/video packet. This improves the accuracy of a determination result.

In addition, the audio/video identifiers of the audio/video packets of the at least one audio/video packet monotonically increase according to the order of the audio/video packets in the live streaming data stream to be processed, which is as an example. When determining whether the audio/video identifier of one audio/video packet of the at least one audio/video packet is an audio/video identifier that is reset after the audio/video identifiers of the audio/video packets in the live streaming data stream to be processed reach a preset end identifier, the stream pulling device can first acquire the audio/video identifier of a first audio/video packet at an interval of a preset number of audio/video packets in a first preset direction from the audio/video packet in the live streaming data stream to be processed, and the audio/video identifier of a second audio/video packet at an interval of the preset number of audio/video packets in a second preset direction of the audio/video packet in the live streaming data stream to be processed, wherein the second preset direction and the first preset direction are opposite. If the audio/video identifier of the first audio/video packet is greater than or equal to the audio/video identifier of the second audio/video packet, the stream pulling device can determine that the audio/video identifier of the audio/video packet is an audio/video identifier that is reset after the audio/video identifiers of the audio/video packets in the live streaming data stream to be processed reach the preset end identifier.

For example, the stream pushing device or the live streaming server marks a packet number on each audio/video packet on Flv tag. Starting with packet number 1 and ending with packet number 100 are taken as examples. The stream pulling device determines that the acquired audio/video packets in the live streaming data stream to be processed include an audio/video packet having the same audio/video identifier as the audio/video identifier of one audio/video packet of the at least one audio/video packet. For example, the audio/video identifier of the audio/video packet is packet number 6, which is the same as the audio/video identifier of an acquired audio/video packet in the live streaming data stream to be processed. The stream pulling device can further acquire the audio/video identifier of the first audio/video packet at the interval of the preset number of audio/video packets in the first preset direction from the audio/video packet in the live streaming data stream to be processed, for example, the audio/video identifier, which is packet number 100, of a first audio/video packet at an interval of five audio/video packets on the left hand side of the audio/video packet, and acquire the audio/video identifier of the second audio/video packet at the interval of the preset number of audio/video packets in the second preset direction of the audio/video packet, for example, the audio/video identifier, which is packet number 12, of a second audio/video packet at an interval of five audio/video packets on the right hand side of the audio/video packet. If the audio/video identifier of the first audio/video packet is greater than the audio/video identifier of the second audio/video packet, the stream pulling device determines that the audio/video identifier of the audio/video packet is an audio/video identifier that is reset after the audio/video identifiers of the audio/video packets in the live streaming data stream to be processed reach the preset end identifier.

The preset number of the interval can be determined according to an actual situation, for example, the interval of five audio/video packets.

S303: If it is determined that one audio/video packet of the at least one audio/video packet is a repeatedly acquired audio/video packet, the audio/video packet is discarded.

In the embodiments of the present disclosure, if it is determined that one audio/video packet of the at least one audio/video packet is a repeatedly acquired audio/video packet, the stream pulling device can discard the audio/video packet to ensure that data sent to the user is unduplicated data. If it is determined that the audio/video packet is not a repeatedly acquired audio/video packet, the stream pulling device can record the audio/video identifier of the audio/video packet, and remove the audio/video identifier of the audio/video packet after recording the audio/video identifier of the audio/video packet, so that a terminal performs audio/video playing on the basis of the audio/video packet with the audio/video identifier removed, to ensure no decoding error occurring on the terminal.

Figure 4:
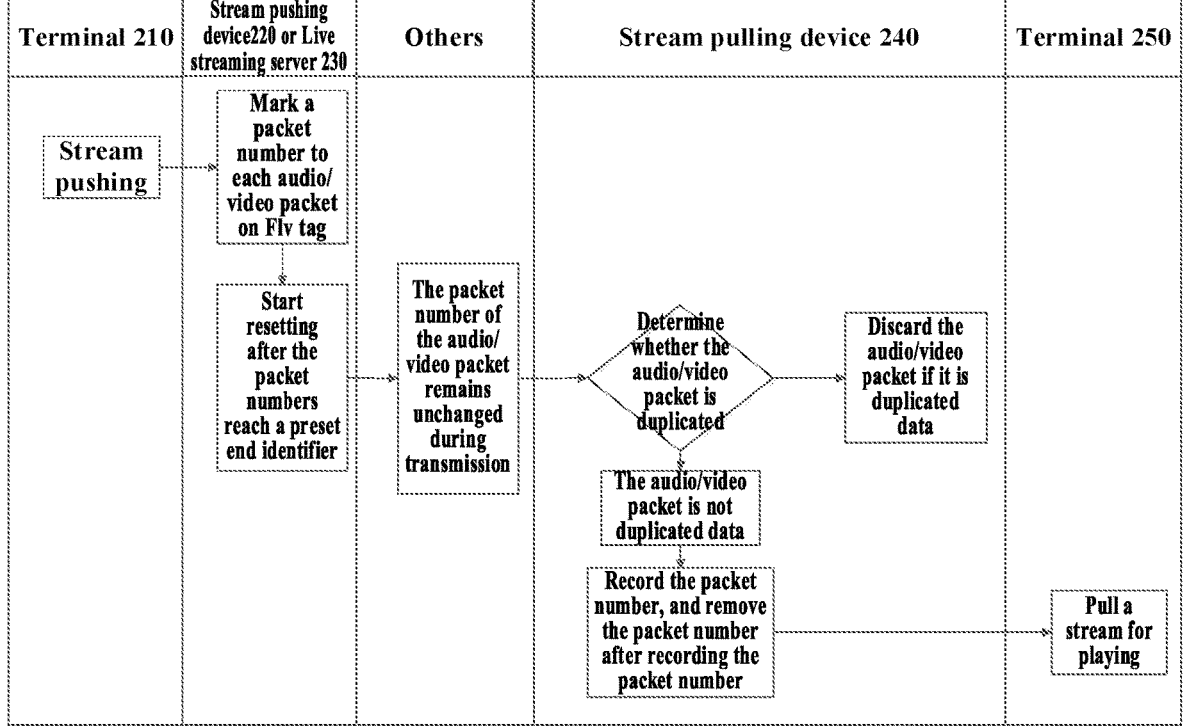
FIG. 4 is a schematic diagram of data deduplication according to an embodiment of the present disclosure.

In order to better understand the embodiments of the present disclosure, in conjunction with FIG. 2 and FIG. 4, a schematic diagram of data deduplication is shown through interactions between the terminal 210, the stream pushing device 220, the live streaming server 230, the stream pulling device 240, and the terminal 250. Exemplarily, as shown in the figures, the live streamer pushes a stream through the terminal 210, and the terminal 210 pushes the live streaming data stream to the live streaming server 230 through the stream pushing device 220. The stream pushing device 220 or the live streaming server 230 marks each audio/video packet with the audio/video identifier. The stream pushing device 220 or the live streaming server 230 marks each audio/video packet with a packet number on Flv tag. The packet numbers monotonically increase, for example, starting with packet number 1. Furthermore, resetting of packet numbers starts after a packet number reaches a preset end identifier, for example, starting with packet number 1 and ending with packet number 100. Resetting of monotonically increasing serial numbers from 1 starts after the packet numbers reach 100. The identifier of the audio/video packet remains unchanged during transmission, that is, the packet number remains unchanged. Therefore, the stream pulling device 240 can determine and discard duplicated audio/video data according to the identifiers, for example, the packet numbers, of the audio/video packets, and the problem of sending duplicated audio/video data to a user due to reconnection of an intermediate link. For example, the stream pulling device 240 determines, according to the audio/video identifier of each audio/video packet, whether the audio/video packet is a repeatedly acquired audio/video packet. For example, the stream pulling device determines, by detecting the packet number of each audio/video packet, whether the audio/video packet is a repeatedly acquired audio/video packet according to the packet number. If the audio/video packet is a repeatedly acquired audio/video packet, the stream pulling device 240 discards the audio/video packet, that is, discards duplicated data. If the audio/video packet is not a repeatedly acquired audio/video packet (not duplicated data), the stream pulling device 240 records the audio/video identifier (such as the packet number) of the audio/video packet, and removes the audio/video identifier of the audio/video packet after recording the audio/video identifier of the audio/video packet. The user uses the terminal 250 to pull a stream from the stream pulling device 240, acquire the live streaming data stream, and play the live streaming data stream.

In the embodiments of the present disclosure, the stream pulling device described above acquires a live streaming data stream to be processed, wherein the live streaming data stream to be processed includes at least one audio/video packet, wherein the following operations can be performed on one audio/video pack among the audio/video packets; the audio/video packet carries an audio/video identifier, and the audio/video identifier is determined according to an order of the audio/video packet in the live streaming data stream: determining, according to the audio/video identifier of the audio/video packet, whether the audio/video packet is a repeatedly acquired audio/video packet, and if it is determined that the audio/video packet is a repeatedly acquired audio/video packet, discarding the audio/video packet. According to the embodiments of the present disclosure, each audio/video packet is uniquely marked with an audio/video identifier, so that repeated audio/video data is determined and discarded by means of audio/video identifiers of audio/video packets, it is ensured that data sent to a user is unduplicated data, and the problem of audio/video rollback caused by playing of duplicated data due to the following reason is solved: In a live streaming process, reconnection of an intermediate link causes a user to acquire some duplicated data.

In addition, in the embodiments of the present disclosure, before determining, according to the audio/video identifier of one audio/video packet of the at least one audio/video packet, whether the audio/video packet is a repeatedly acquired audio/video packet, the stream pulling device further determines whether the live streaming data stream to be processed is a new pushed stream. If the live streaming data stream to be processed is not a new pushed stream, the stream pulling device executes the step of determining, according to the audio/video identifier of one audio/video packet of the at least one audio/video packet, whether the audio/video packet is a repeatedly acquired audio/video packet. If the live streaming data stream to be processed is a new pushed stream, the stream pulling device can record the audio/video identifiers carried in the audio/video packets in the live streaming data stream to be processed for subsequent data deduplication based on the recorded audio/video identifiers. Moreover, before determining, according to the audio/video identifier of one audio/video packet of the at least one audio/video packet, whether the audio/video packet is a repeatedly acquired audio/video packet, the stream pulling device further determines whether the audio/video identifier of the audio/video packet is empty. If the audio/video identifier of the audio/video packet is not empty, the stream pulling device executes the step of determining, according to the audio/video identifier of the audio/video packet, whether the audio/video packet is a repeatedly acquired audio/video packet. If the audio/video identifier of the audio/video packet is empty, it indicates that the stream pushing device or the live streaming server does not add an audio/video identifier to the audio/video packet. The stream pulling device determines that the audio/video packet is not a repeatedly acquired audio/video packet and will not discard the audio/video packet.

Before determining, according to the audio/video identifier of one audio/video packet of the at least one audio/video packet, whether the audio/video packet is a repeatedly acquired audio/video packet, the stream pulling device can determine whether the live streaming data stream to be processed is a new pushed stream, and/or, determine whether the audio/video identifier of the audio/video packet is empty. In a case where both the operations are performed, the sequence of the two operations can be determined according to an actual situation. For example, the step of determining whether the live streaming data stream to be processed is a new pushed stream is first executed, and the step of determining whether the audio/video identifier of the audio/video packet is empty is then executed. FIG. 5 is a flowchart of another data deduplication method according to an embodiment of the present disclosure. As shown in FIG. 5, the method includes the following steps:

S501: A live streaming data stream to be processed is acquired, wherein the live streaming data stream to be processed includes at least one audio/video packet, and following operations S501s to S505 can be performed on one audio/video pack of the at least one audio/video packet, wherein each audio/video packet of the at least one audio/video packet carries an audio/video identifier, and the audio/video identifier is determined according to an order of the audio/video packet of the at least one audio/video packet in the live streaming data stream to be processed.

Implementation of step S501 is the same as that of step S301 described above, and will not be described in detail here.

S502: Whether the live streaming data stream to be processed is a new pushed stream is determined.

The live streaming data stream to be processed can carry a stream pushing timestamp, and the stream pushing timestamp represents pushing time of the live streaming data stream to be processed. A stream pushing timestamp corresponds to a live streaming data stream, which means that different live streaming data streams have different stream pushing timestamps.

The stream pulling device can determine, according to the stream pushing timestamp carried by the live streaming data stream to be processed, whether the stream pushing timestamp changes. If it is determined that the stream pushing timestamp changes, the stream pulling device determines that the live streaming data stream to be processed is a new pushed stream. If it is determined that the stream pushing timestamp does not change, the stream pulling device determines that the live streaming data stream to be processed is not a new pushed stream.

The stream pulling device can determine, according to a recorded stream pushing timestamp carried by a previous live streaming data stream to be processed and the stream pushing timestamp carried by the live streaming data stream to be processed, whether the stream pushing timestamp changes. That is, if the two stream pushing timestamps are the same, the stream pulling device determines that the stream pushing timestamp does not change. If the two stream pushing timestamps are different, the stream pulling device determines that the stream pushing timestamp changes.

The stream pushing device or the live streaming server can record a stream pushing timestamp in metadata of a live stream, to represent the pushing time of this stream.

S503: If the live streaming data stream to be processed is not a new pushed stream, whether the audio/video identifier of the audio/video packet is empty is determined.

In the embodiments of the present disclosure, if the live streaming data stream to be processed is a new pushed stream, it indicates that the stream pulling device has not acquired any data from the live streaming data stream to be processed, and the live streaming data stream to be processed does not include duplicated data. The stream pulling device can record the audio/video identifier carried by the audio/video packets in the live streaming data stream to be processed, as well as the stream pushing timestamp carried by the live streaming data stream to be processed, for subsequent data deduplication based on the recorded information.

If the live streaming data stream to be processed is not a new pushed stream, the stream pulling device can further determine whether the audio/video identifier of the audio/video packet is empty, that is, whether the stream pushing device or the live streaming server has added an audio/video identifier to the audio/video packet. If the audio/video identifier of the audio/video packet is not empty, it indicates that the stream pushing device or the live streaming server has added an audio/video identifier to the audio/video packet. The stream pulling device determines, on the basis of the audio/video identifier of the audio/video packet, whether the audio/video packet is a repeatedly acquired audio/video packet. If the audio/video identifier of the audio/video packet is empty, it indicates that the stream pushing device or the live streaming server does not add an audio/video identifier to the audio/video packet. The stream pulling device determines that the audio/video packet is not a repeatedly acquired audio/video packet and will not discard the audio/video packet.

S504: If the audio/video identifier of the audio/video packet is not empty, whether the audio/video packet is a repeatedly acquired audio/video packet is determined according to the audio/video identifier of the audio/video packet.

By way of example, the stream pushing device or the live streaming server adds audio/video identifiers, for example, packet numbers, to audio/video packets, and the packet numbers monotonically increases from packet number 1. When determining whether the audio/video identifier of the audio/video packet is empty, the stream pulling device can determine whether the audio/video identifier of the above audio/video packet is 0. If the audio/video identifier of the audio/video packet is 0, the stream pulling device determines that the audio/video identifier of the audio/video packet is empty. If the audio/video identifier of the audio/video packet is not 0, for example, 1, 2, 3, or the like, the stream pulling device determines that the audio/video identifier of the audio/video packet is not empty.

In addition, the implementation of determining, according to the audio/video identifier of the audio/video packet, whether the audio/video packet is a repeatedly acquired audio/video packet is the same as the implementation of step S302, and will not be described in detail here.

S505: If it is determined that the audio/video packet is a repeatedly acquired audio/video packet, the audio/video packet is discarded.

Implementation of step S505 is the same as that of step S303 described above, and will not be described in detail here.

In the embodiments of the present disclosure, before determining, according to the audio/video identifier of one audio/video packet of the at least one audio/video packet, whether the audio/video packet is a repeatedly acquired audio/video packet, the stream pulling device can also determine whether the live streaming data stream to be processed is a new pushed stream and determine whether the audio/video identifier of the audio/video packet is empty. In a case that the live streaming data stream to be processed is not a new pushed stream and the audio/video identifier of the audio/video packet is not empty, the subsequent data deduplication operation is performed, which improve the accuracy of data deduplication and meet an actual application need. Moreover, according to the embodiments of the present disclosure, each audio/video packet is uniquely marked with an audio/video identifier, so that repeated audio/video data is determined and discarded by means of audio/video identifiers of audio/video packets, it is ensured that data sent to a user is unduplicated data, and the problem of audio/video rollback caused by playing of duplicated data due to the following reason is solved: In a live streaming process, reconnection of an intermediate link causes a user to acquire some duplicated data.

Figure 6:
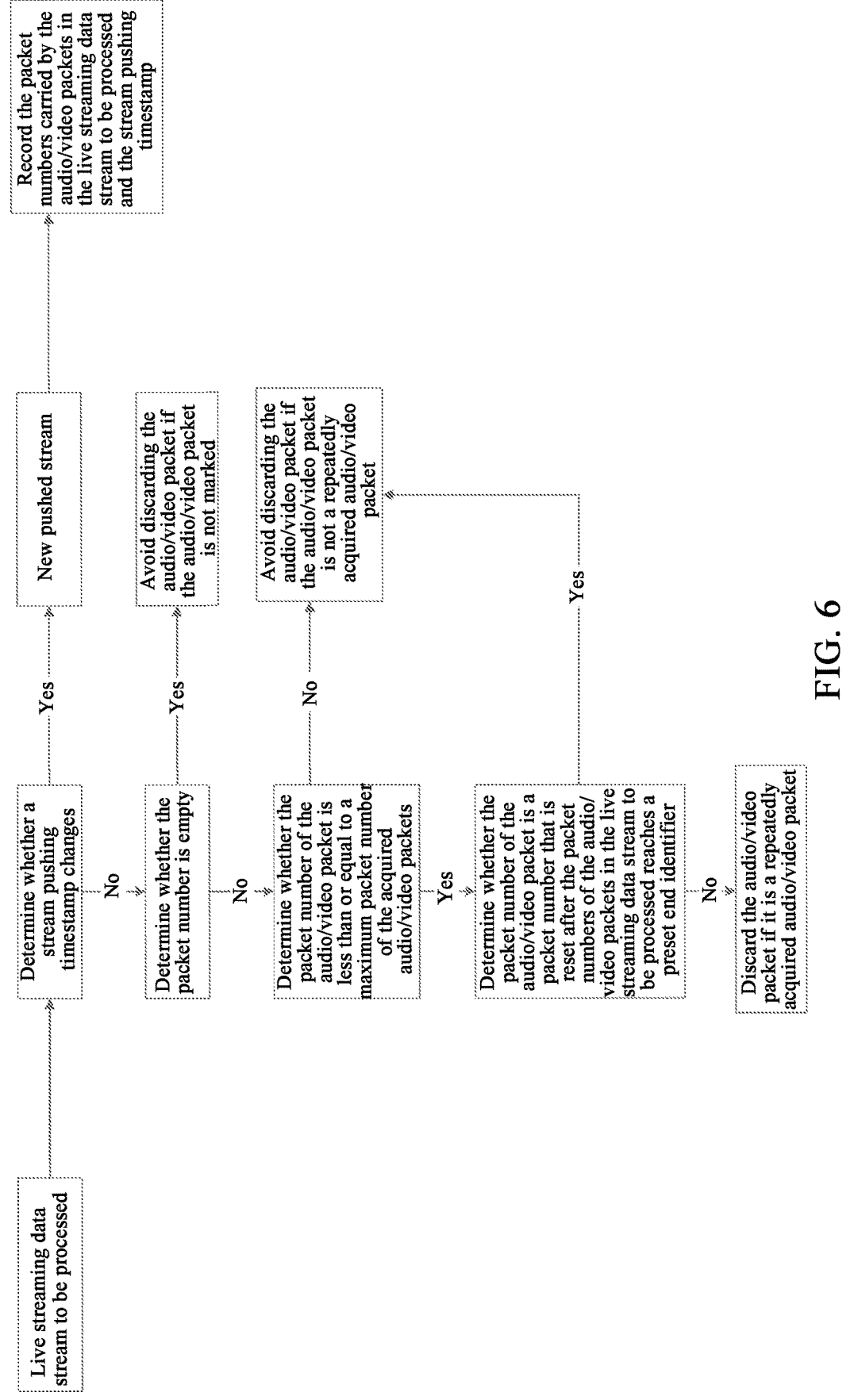
FIG. 6 is a schematic diagram of another data deduplication according to an embodiment of the present disclosure.

As shown in FIG. 6, by way of example, the stream pushing device or the live streaming server adds audio/video identifiers, for example, packet numbers, to audio/video packets. The packet numbers monotonically increase from packet number 1. Furthermore, a stream pushing timestamp is recorded in a live stream to represent the pushing time of this stream. The stream pulling device can first acquire a live streaming data stream to be processed from the live streaming server. The live streaming data stream to be processed includes at least one audio/video packet, and following operations can be performed on one audio/video pack of the at least one audio/video packet. Each audio/video packet of the at least one audio/video packet carries an audio/video identifier, and the audio/video identifier is determined according to an order of the audio/video packet of the at least one audio/video packet in the live streaming data stream to be processed: determining, according to the stream pushing timestamp carried by the live streaming data stream to be processed, whether the stream pushing timestamp changes; if it is determined that the stream pushing timestamp changes, determining that the live streaming data stream to be processed is a new pushed stream. The packet numbers and the stream pushing timestamp carried in the live streaming data stream to be processed can be recorded for subsequent data deduplication based on the recorded information. If it is determined that the stream pushing timestamp does not change, the stream pulling device determines that the live streaming data stream to be processed is not a new pushed stream, and can further determine whether the packet number of the audio/video packet is empty, for example, whether the packet number of the audio/video packet is 0. If the packet number of the audio/video packet is 0, the stream pulling device determines that the packet number of the audio/video packet is empty, and then determines that the audio/video packet is not marked, which is not a repeatedly acquired audio/video packet and will not be discarded. If the packet number of the audio/video packet is not 0, for example, 1, 2, 3, or the like, the stream pulling device determines that the packet number of the audio/video packet is not empty, and then determines, according to the packet number of the audio/video packet, whether the audio/video packet is a repeatedly acquired audio/video packet.

Exemplarily, the stream pulling device can determine a maximum packet number of the acquired audio/video packets according to the audio/video packets of the acquired live streaming data stream to be processed, and then determine whether the packet number of the audio/video packet is less than or equal to the maximum packet number of the acquired audio/video packets. If the packet number of the audio/video packet is less than or equal to the maximum packet number of the acquired audio/video packets, the stream pulling device determines that the audio/video packets in the acquired live streaming data stream to be processed include an audio/video packet having the same packet number as the packet number of the video packet. If the packet number of the audio/video packet is greater than the maximum packet number of the acquired audio/video packets, the stream pulling device determines that the audio/video packets in the acquired live streaming data stream to be processed do not include an audio/video packet having the same packet number as the packet number of the video packet, thus determining that the audio/video packet is not a repeatedly acquired audio/video packet and will not be discarded. Moreover, after determining that the acquired audio/video packets in the live streaming data stream to be processed include an audio/video packet having the same packet number as the packet number of the video packet, the stream pulling device can further determine whether the packet number of the audio/video packet is a packet number that is reset after the packet numbers of the audio/video packets in the live streaming data stream to be processed reach a preset end identifier. If the packet number of the audio/video packet is not a packet number that is reset after the packet numbers of the audio/video packets in the live streaming data stream to be processed reach the preset end identifier, the stream pulling device determines that the audio/video packet is a repeatedly acquired audio/video packet and discards the audio/video packet. If the packet number of the audio/video packet is a packet number that is reset after the packet numbers of the audio/video packets in the live streaming data stream to be processed reach the preset end identifier, the stream pulling device determines that the audio/video packet is not a repeatedly acquired audio/video packet and does not discard the audio/video packet.

Compared with the existing data deduplication, the stream pulling device uniquely marks each audio/video packet with an audio/video identifier, namely, a packet number, so that duplicated audio/video data is determined and discarded by means of packet numbers of audio/video packets in a live streaming data stream, it is ensured that data sent to a user is unduplicated data, and the problem of audio/video rollback caused by playing of duplicated data due to the following reason is solved: In a live streaming process, reconnection of an intermediate link causes a user to acquire some duplicated data.

Figure 7:
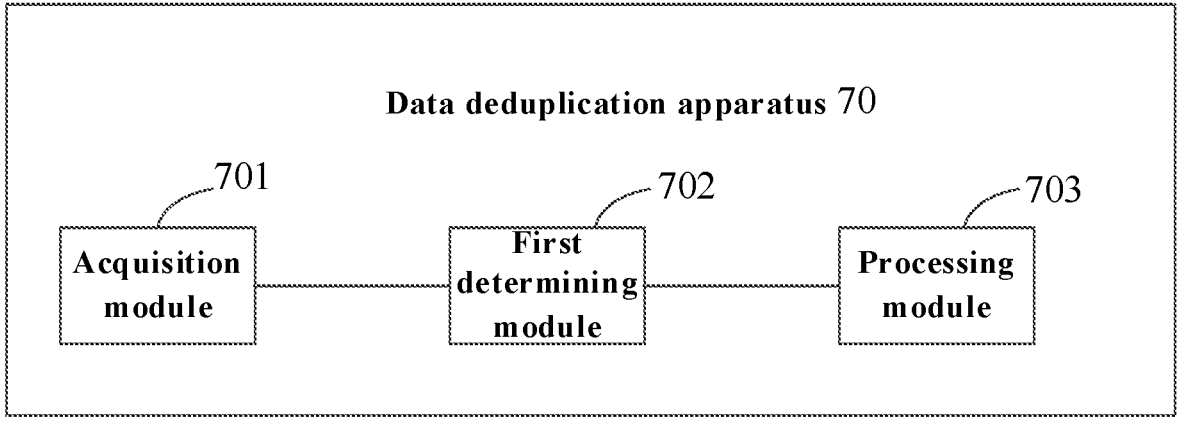
FIG. 7 is a schematic structural diagram of a data deduplication apparatus according to an embodiment of the present disclosure.

Corresponding to the data deduplication method in the above embodiment, FIG. 7 is a schematic structural diagram of a data deduplication apparatus according to an embodiment of the present disclosure. For ease of explanation, only parts related to the embodiments of the present disclosure are shown. FIG. 7 is a schematic structural diagram of a data deduplication apparatus according to an embodiment of the present disclosure. The data deduplication apparatus 70 includes an acquisition module 701, a first determining module 702, and a processing module 703. The data deduplication apparatus here can be the aforementioned stream pulling device itself, or a chip or integrated circuit that achieves the functions of the stream pulling device. It should be noted that the division of the acquisition module, the first determining module, and the processing module is only a division of logical functions. Physically, the two modules can be integrated or independent.

The acquisition module 701 is configured to: acquire a live streaming data stream to be processed, wherein the live streaming data stream to be processed includes at least one audio/video packet; and perform following operations on one audio/video pack of the at least one audio/video packets, wherein each audio/video packet of the at least one audio/video packet carries an audio/video identifier, and the audio/video identifier is determined according to an order of the audio/video packet of the at least one audio/video packet in the live streaming data stream to be processed.

The first determining module 702 is configured to determine, according to the audio/video identifier of one audio/video packet of the at least one audio/video packet, whether the audio/video packet of the at least one audio/video packet is a repeatedly acquired audio/video packet.

The processing module 703 is configured to: if it is determined that the audio/video packet of the at least one audio/video packet is a repeatedly acquired audio/video packet, discard the audio/video packet of the at least one audio/video packet.

In a possible implementation, the first determining module 702 is specifically configured to:

determine whether the acquired audio/video packets in the live streaming data stream to be processed include an audio/video packet having the same audio/video identifier as the audio/video identifier of one audio/video packet of the at least one audio/video packet; and if the acquired audio/video packets in the live streaming data stream to be processed include an audio/video packet having the same audio/video identifier as the audio/video identifier of one audio/video packet of the at least one audio/video packet, determine that the audio/video packet of the at least one audio/video packet is a repeatedly acquired audio/video packet.

In a possible implementation, the first determining module 702 is further configured to:

determine whether the audio/video identifier of one audio/video packet of the at least one audio/video packet is an audio/video identifier that is reset after the audio/video identifiers of the audio/video packets in the live streaming data stream to be processed reach a preset end identifier; and if the audio/video identifier of one audio/video packet of the at least one audio/video packet is not an audio/video identifier that is reset after the audio/video identifiers of the audio/video packets in the live streaming data stream to be processed reach the preset end identifier, determine that the audio/video packet of the at least one audio/video packet is a repeatedly acquired audio/video packet.

In a possible implementation, the audio/video identifiers of the audio/video packets of the at least one audio/video packet monotonically increase according to the order of the audio/video packets of the at least one audio/video packet in the live streaming data stream to be processed.

The first determining module 702 is specifically configured to:

determine a maximum audio/video identifier of the acquired audio/video packets according to the audio/video packets of the acquired live streaming data stream to be processed;

determine whether the audio/video identifier of one audio/video packet of the at least one audio/video packet is less than or equal to the maximum audio/video identifier of the acquired audio/video packets; and if the audio/video identifier of one audio/video packet of the at least one audio/video packet is less than or equal to the maximum audio/video identifier of the acquired audio/video packets, determine that the acquired audio/video packets in the live streaming data stream to be processed include an audio/video packet having the same audio/video identifier as the audio/video identifier of one audio/video packet of the at least one audio/video packet.

In a possible implementation, the audio/video identifiers of the audio/video packets of the at least one audio/video packet monotonically increase according to the order of the audio/video packets of the at least one audio/video packet in the live streaming data stream to be processed.

The first determining module 702 is specifically configured to:

acquire the audio/video identifier of a first audio/video packet at an interval of a preset number of audio/video packets in a first preset direction from one audio/video packet of the at least one audio/video packet in the live streaming data stream to be processed, and the audio/video identifier of a second audio/video packet at an interval of the preset number of audio/video packets in a second preset direction of one audio/video packet of the at least one audio/video packet in the live streaming data stream to be processed, wherein the second preset direction and the first preset direction are opposite; and if the audio/video identifier of the first audio/video packet is greater than or equal to the audio/video identifier of the second audio/video packet, determine that the audio/video identifier of one audio/video packet of the at least one audio/video packet is an audio/video identifier that is reset after the audio/video identifiers of the audio/video packets in the live streaming data stream to be processed reach the preset end identifier.

In a possible implementation, the processing module 703 is further configured to:

if it is determined that the audio/video packet of the at least one audio/video packet is not a repeatedly acquired audio/video packet, record the audio/video identifier of the audio/video packet of the at least one audio/video packet, and remove the audio/video identifier of one audio/video packet of the at least one audio/video packet after recording the audio/video identifier of the audio/video packet of the at least one audio/video packet, so that a terminal performs audio/video playing on the basis of one audio/video packet of the at least one audio/video packet with the audio/video identifier removed.

The apparatus according to the embodiments of the present disclosure can be configured to implement the technical solution of the method embodiment shown in FIG. 3 described above, and an implementation principle and technical effects thereof are similar to those of the method embodiment, so that the apparatus will not be described in detail here in the embodiments of the present disclosure.

Figure 8:
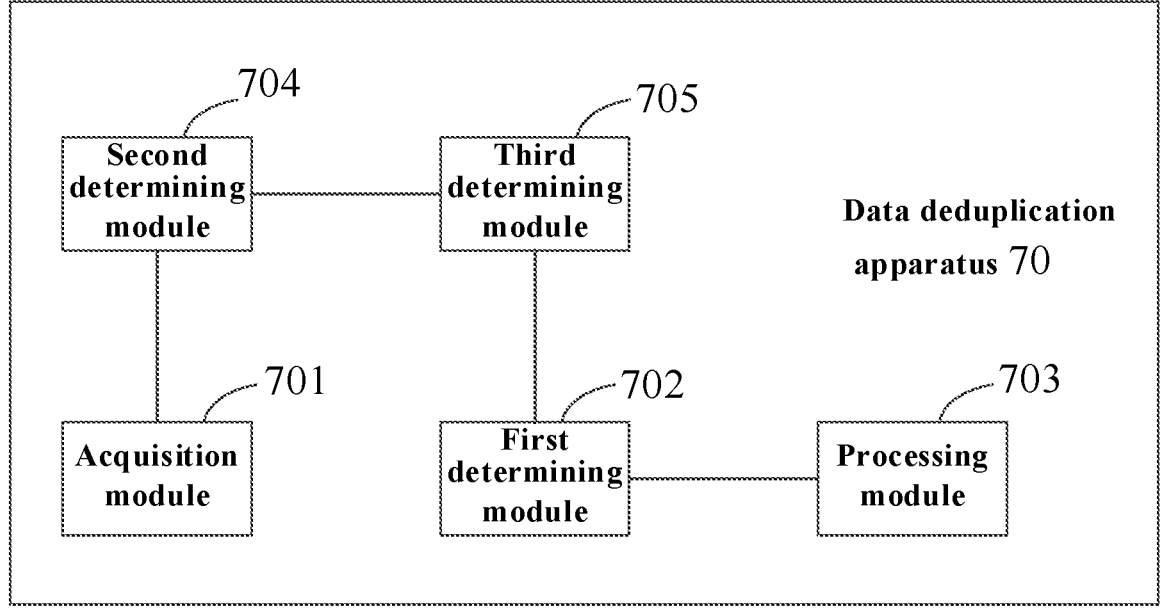
FIG. 8 is a schematic structural diagram of another data deduplication apparatus according to an embodiment of the present disclosure.

FIG. 8 is a schematic structural diagram of another data deduplication apparatus according to an embodiment of the present disclosure. Based on FIG. 7, the data deduplication apparatus 70 described above further includes: a second determining module 704 and a third determining module 705.

In a possible implementation, the second determining module 704 is configured to: before the first determining module 702 determines, according to the audio/video identifier of one audio/video packet of the at least one audio/video packet, whether the audio/video packet of the at least one audio/video packet is a repeatedly acquired audio/video packet, determine whether the live streaming data stream to be processed is a new pushed stream.

The first determining module 702 is specifically configured to:

if the live streaming data stream to be processed is not a new pushed stream, determine, according to the audio/video identifier of one audio/video packet of the at least one audio/video packet, whether the audio/video packet of the at least one audio/video packet is a repeatedly acquired audio/video packet.

In a possible implementation, the live streaming data stream to be processed carries a stream pushing timestamp.

The second determining module 704 is specifically configured to:

determine, according to the stream pushing timestamp, whether the stream pushing timestamp changes; and if it is determined that the stream pushing timestamp changes, determine that the live streaming data stream to be processed is a new pushed stream.

In a possible implementation, the third determining module 705 is configured to: before the first determining module 702 determines, according to the audio/video identifier of one audio/video packet of the at least one audio/video packet, whether the audio/video packet of the at least one audio/video packet is a repeatedly acquired audio/video packet, determine whether the audio/video identifier of one audio/video packet of the at least one audio/video packet is empty.

The first determining module 702 is specifically configured to:

if the audio/video identifier of one audio/video packet of the at least one audio/video packet is not empty, determine, according to the audio/video identifier of one audio/video packet of the at least one audio/video packet, whether the audio/video packet of the at least one audio/video packet is a repeatedly acquired audio/video packet.

In addition, the third determining module 705 can also be configured to: after the second determining module 704 determines whether the live streaming data stream to be processed is a new pushed stream, if the live streaming data stream to be processed is not a new pushed stream, determine whether the audio/video identifier of one audio/video packet of the at least one audio/video packet is empty.

The apparatus according to the embodiments of the present disclosure can be configured to implement the technical solution of the method embodiment shown in FIG. 5 described above, and an implementation principle and technical effects thereof are similar to those of the method embodiment, so that the apparatus will not be described in detail here in the embodiments of the present disclosure.

Figure 9A:
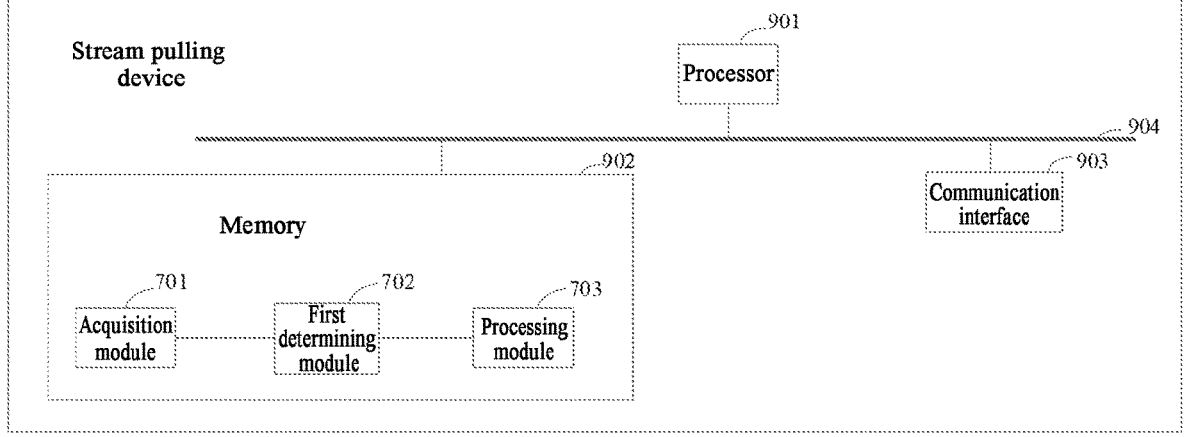
FIG. 9A is a schematic diagram of a basic hardware architecture of a stream pulling device according to the present disclosure.
Figure 9B:
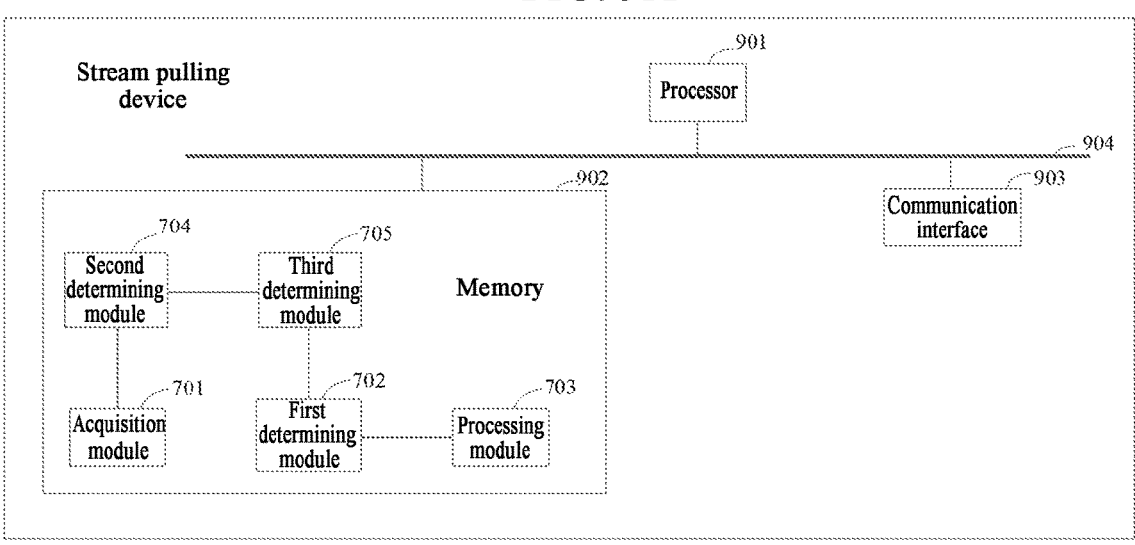
FIG. 9B is a schematic diagram of a basic hardware architecture of another stream pulling device according to the present disclosure.

Optionally, FIG. 9A and FIG. 9B schematically provide a possible basic hardware architecture of the stream pulling device of the present disclosure respectively.

Referring to FIG. 9A and FIG. 9B, the stream pulling device includes at least one processor 901 and a communication interface 903. Further optionally, the stream pulling device can further include a memory 902 and a bus 904.

The stream pulling device may include one or more processors 901. One processor 901 is shown in FIG. 9A and FIG. 9B only. Optionally, the processor 901 can be a central processing unit (CPU), graphics processing unit (GPU), or digital signal processor (DSP). If the stream pulling device includes a plurality of processors 901, the types of the plurality of processors 901 can be different or the same. Optionally, the plurality of processors 901 of the stream pulling device can also be integrated as a multi-core processor.

The memory 902 stores computer instructions and data. The memory 902 can store computer instructions and data required to implement the data deduplication method provided by the present disclosure. For example, the memory 902 stores instructions used for implementing the steps of the data deduplication method. The memory 902 can be any one or any combination of the following storage media: a non-volatile memory (such as a Read Only Memory (ROM), a Solid State Drive (SSD), a Hard State Drive (HDD), an optical disc, and a volatile memory.

The communication interface 903 can provide information input/output for the at least one processor. The communication interface can also include any one or any combination of the following devices: a network interface (such as an Ethernet interface), a wireless network card, and other devices with a network access function.

Optionally, the communication interface 903 can also be used for data communication between the stream pulling devices and other computing devices or terminals.

Further optionally, a bus 904 is represented with a thick line in FIG. 9A and FIG. 9B. The bus 904 can connect the processor 901 to the memory 902 and the communication interface 903. In this way, through the bus 904, the processor 901 can access the memory 902 and can also perform data interaction with other computing devices or terminals using the communication interface 903.

In the present disclosure, the stream pulling device executes the computer instructions in the memory 902 to cause the stream pulling device to implement the data deduplication method provided by the present disclosure, or to deploy the data deduplication apparatus.

From the perspective of the division of the logical functions, exemplarily, as shown in FIG. 9A, the memory 902 may include an acquisition module 701, a first determining module 702, and a processing module 703. The inclusion here only involves the functions of the acquisition module, the first determining module, and the processing module when the instructions stored in the memory are executed, instead of limiting physical structures.

In a possible design, as shown in FIG. 9B, the memory 902 includes a second determining module 704 and a third determining module 705. The inclusion here only involves the implementation of the functions of the second determining module and the third determining module when the instructions stored in the memory are executed, instead of limiting physical structures.

In addition, the stream pulling device can be implemented through software, as shown in FIG. 9A and FIG. 9B, or can be implemented through hardware as a hardware module or a circuit unit.

The present disclosure provides a computer-readable storage medium. The computer-readable storage medium stores a computer program, and when a processor executes the computer program, the processor is caused to perform the data deduplication method provided by the present disclosure.

The embodiments of the present disclosure provide a computer program product, including computer instructions. The computer instructions, when executed by a processor, implement the data deduplication method provided by the present disclosure.

The embodiments of the present disclosure provide a computer program. The computer program is configured to implement the data deduplication method provided by the present disclosure.

The present disclosure provides a chip, including at least one processor and a communication interface. The communication interface provides information input and/or output for the at least one processor. Further, the chip can also include at least one memory. The memory is configured to store computer instructions. The at least one processor is configured to call and run the computer instructions to perform the data deduplication method provided by the present disclosure.

In the several embodiments provided by the present disclosure, it should be understood that the disclosed apparatus and method are achieved in other manners. For example, the above-described apparatus embodiments are merely illustrative. For example, the division of the units is only one type of logical functional division, and other divisions is achieved in practice. For example, multiple units or components can be combined or integrated into another system, or some features can be omitted, or not executed. In addition, the shown or discussed mutual coupling or direct coupling or communication connection is an indirect coupling or communication connection through some interfaces, apparatuses or units, and is in an electrical, mechanical or another form.

The units described as separate parts may or may not be physically separated, and parts displayed as units may or may not be physical units, that is, may be located in one position, or may be distributed on multiple network units. Some or all of the units are selected according to actual needs to achieve the objective of the solution of this embodiment.

We claim:

1. A data deduplication method, comprising:

acquiring a live streaming data stream to be processed, the live streaming data stream to be processed comprising at least one audio/video packet;

performing following operations on one audio/video packet of the at least one audio/video packet, wherein an audio/video packet of the at least one audio/video packet carries an audio/video identifier, and the audio/video identifier is determined according to an order of audio/video packets of the at least one audio/video packet in the live streaming data stream to be processed:

determining, according to the audio/video identifier of the one audio/video packet of the at least one audio/video packet, whether the one audio/video packet of the at least one audio/video packet is a repeatedly acquired audio/video packet;

when it is determined that the one audio/video packet of the at least one audio/video packet is not a repeatedly acquired audio/video packet, recording the audio/video identifier of the one audio/video packet of the at least one audio/video packet, and removing the audio/video identifier of the one audio/video packet of the at least one audio/video packet after recording the audio/video identifier of the one audio/video packet of the at least one audio/video packet, so that a terminal performs audio/video playing based on the one audio/video packet of the at least one audio/video packet with the audio/video identifier removed; and when it is determined that the one audio/video packet of the at least one audio/video packet is a repeatedly acquired audio/video packet, discarding the one audio/video packet of the at least one audio/video packet.

2. The method according to claim 1, wherein the determining whether the one audio/video packet of the at least one audio/video packet is a repeatedly acquired audio/video packet according to the audio/video identifier of the one of the at least one audio/video packet, comprises:

determining whether audio/video packets in the acquired live streaming data stream to be processed comprise an audio/video packet having the same audio/video identifier as the audio/video identifier of the one audio/video packet of the at least one audio/video packet; and if the audio/video packets in the acquired live streaming data stream to be processed comprise an audio/video packet having the same audio/video identifier as the audio/video identifier of the one audio/video packet of the at least one audio/video packet, determining that the one audio/video packet of the at least one audio/video packet is a repeatedly acquired audio/video packet.

3. The method according to claim 2, wherein before the determining that the one audio/video packet of the at least one audio/video packet is a repeatedly acquired audio/video packet, the method further comprises:

determining whether the audio/video identifier of the one audio/video packet of the at least one audio/video packet is an audio/video identifier that is reset after audio/video identifiers of the audio/video packets in the live streaming data stream to be processed reach a preset end identifier; and the determining that the one audio/video packet of the at least one audio/video packet is a repeatedly acquired audio/video packet comprises:

if the audio/video identifier of the one audio/video packet of the at least one audio/video packet is not an audio/video identifier that is reset after the audio/video identifiers of audio/video packets in the live streaming data stream to be processed reach the preset end identifier, determining that the one audio/video packet of the at least one audio/video packet is a repeatedly acquired audio/video packet.

4. The method according to claim 2, wherein the audio/video identifiers of the audio/video packets of the at least one audio/video packet monotonically increase according to the order of the audio/video packets of the at least one audio/video packet in the live streaming data stream to be processed;

the determining whether the audio/video packets in the acquired live streaming data stream to be processed comprise an audio/video packet having the same audio/video identifier as the audio/video identifier of the one audio/video packet of the at least one audio/video packet comprises:

determining a maximum audio/video identifier of the acquired audio/video packets according to the audio/video packets of the acquired live streaming data stream to be processed;

determining whether the audio/video identifier of the one audio/video packet of the at least one audio/video packet is less than or equal to the maximum audio/video identifier of the acquired audio/video packets; and if the audio/video identifier of the one audio/video packet of the at least one audio/video packet is less than or equal to the maximum audio/video identifier of the acquired audio/video packets, determining that the acquired audio/video packets in the live streaming data stream to be processed comprise an audio/video packet having the same audio/video identifier as the audio/video identifier of the one audio/video packet of the at least one audio/video packet.

5. The method according to claim 3, wherein the audio/video identifiers of the audio/video packets of the at least one audio/video packet monotonically increase according to the order of the audio/video packets of the at least one audio/video packet in the live streaming data stream to be processed;

the determining whether the audio/video identifier of one audio/video packet of the at least one audio/video packet is an audio/video identifier that is reset after the audio/video identifiers of the audio/video packets in the live streaming data stream to be processed reach a preset end identifier comprises:

acquiring the audio/video identifier of a first audio/video packet at an interval of a preset number of audio/video packets in a first preset direction from the one audio/video packet of the at least one audio/ video packet in the live streaming data stream to be processed, and the audio/video identifier of a second audio/video packet at an interval of the preset number of audio/video packets in a second preset direction from one audio/video packet of the at least one audio/video packet in the live streaming data stream to be processed, wherein the second preset direction and the first preset direction are opposite; and if the audio/video identifier of the first audio/video packet is greater than or equal to the audio/video identifier of the second audio/video packet, determining that the audio/video identifier of the one audio/video packet of the at least one audio/video packet is an audio/video identifier that is reset after the audio/video identifiers of the audio/video packets in the live streaming data stream to be processed reach the preset end identifier.

6. The method according to claim 1, wherein before the determining, according to the audio/video identifier of the one audio/video packet of the at least one audio/video packet, whether the one audio/video packet of the at least one audio/video packet is a repeatedly acquired audio/video packet, the method further comprises:

determining whether the live streaming data stream to be processed is a new pushed stream; and the determining, according to the audio/video identifier of the one audio/video packet of the at least one audio/video packet, whether the one audio/video packet of the at least one audio/video packet is a repeatedly acquired audio/video packet comprises:

if the live streaming data stream to be processed is not a new pushed stream, determining, according to the audio/video identifier of one audio/video packet of the at least one audio/video packet, whether the one audio/video packet of the at least one audio/video packet is a repeatedly acquired audio/video packet.

7. The method according to claim 6, wherein the live streaming data stream to be processed carries a stream pushing timestamp; and the determining whether the live streaming data stream to be processed is a new pushed stream comprises:

determining, according to the stream pushing timestamp, whether the stream pushing timestamp changes; and when it is determined that the stream pushing timestamp changes, determining that the live streaming data stream to be processed is a new pushed stream.

8. The method according to claim 1, wherein before the determining, according to the audio/video identifier of the one audio/video packet of the at least one audio/video packet, whether the one audio/video packet of the at least one audio/video packet is a repeatedly acquired audio/video packet, the method further comprises:

determining whether the audio/video identifier of the one audio/video packet of the at least one audio/video packet is empty; and the determining, according to the one audio/video identifier of one audio/video packet of the at least one audio/video packet, whether the one audio/video packet of the at least one audio/video packet is a repeatedly acquired audio/video packet comprises:

if the audio/video identifier of the one audio/video packet of the at least one audio/video packet is not empty, determining, according to the audio/video identifier of the one audio/video packet of the at least one audio/video packet, whether the audio/video packet of the at least one audio/video packet is a repeatedly acquired audio/video packet.

9. A stream pulling device, comprising:

a processor;

a memory; and a computer program, wherein the computer program is stored in the memory and is configured to be executed by the processor, and the computer program comprises instructions used for causing the stream pulling device to:

acquire a live streaming data stream to be processed, the live streaming data stream to be processed comprising at least one audio/video packet;

perform following operations on one audio/video packet of the at least one audio/video packet, wherein an audio/video packet of the at least one audio/video packet carries an audio/video identifier, and the audio/video identifier is determined according to an order of audio/video packets of the at least one audio/video packet in the live streaming data stream to be processed:

determine, according to the audio/video identifier of the one audio/video packet of the at least one audio/video packet, whether the one audio/video packet of the at least one audio/video packet is a repeatedly acquired audio/video packet;

when it is determined that the one audio/video packet of the at least one audio/video packet is not a repeatedly acquired audio/video packet, record the audio/video identifier of the one audio/video packet of the at least one audio/video packet, and remove the audio/video identifier of the one audio/video packet of the at least one audio/video packet after recording the audio/video identifier of the one audio/video packet of the at least one audio/video packet, so that a terminal performs audio/video playing based on the one audio/video packet of the at least one audio/video packet with the audio/video identifier removed; and when it is determined that the one audio/video packet of the at least one audio/video packet is a repeatedly acquired audio/video packet, discard the one audio/video packet of the at least one audio/video packet.

10. The stream pulling device according to claim 9, wherein instructions used for causing the stream pulling device to determine whether the one audio/video packet of the at least one audio/video packet is a repeatedly acquired audio/video packet according to the audio/video identifier of the one of the at least one audio/video packet, further comprise instructions used for causing the stream pulling device to:

determine whether audio/video packets in the acquired live streaming data stream to be processed comprise an audio/video packet having the same audio/video identifier as the audio/video identifier of the one audio/video packet of the at least one audio/video packet; and if the audio/video packets in the acquired live streaming data stream to be processed comprise an audio/video packet having the same audio/video identifier as the audio/video identifier of the one audio/video packet of the at least one audio/video packet, determine that the one audio/video packet of the at least one audio/video packet is a repeatedly acquired audio/video packet.

11. The stream pulling device according to claim 10, wherein before determining that the one audio/video packet of the at least one audio/video packet is a repeatedly acquired audio/video packet, the instructions further comprise instructions used for causing the stream pulling device to:

determine whether the audio/video identifier of the one audio/video packet of the at least one audio/video packet is an audio/video identifier that is reset after audio/video identifiers of the audio/video packets in the live streaming data stream to be processed reach a preset end identifier; and the instructions used for causing the stream pulling device to determine that the one audio/video packet of the at least one audio/video packet is a repeatedly acquired audio/video packet further comprises instructions used for causing the stream pulling device to:

if the audio/video identifier of the one audio/video packet of the at least one audio/video packet is not an audio/video identifier that is reset after the audio/video identifiers of audio/video packets in the live streaming data stream to be processed reach the preset end identifier, determine that the one audio/video packet of the at least one audio/video packet is a repeatedly acquired audio/video packet.

12. The stream pulling device according to claim 10, wherein the audio/video identifiers of the audio/video packets of the at least one audio/video packet monotonically increase according to the order of the audio/video packets of the at least one audio/video packet in the live streaming data stream to be processed;

the instructions used for causing the stream pulling device to determine whether the audio/video packets in the acquired live streaming data stream to be processed comprise an audio/video packet having the same audio/video identifier as the audio/video identifier of the one audio/video packet of the at least one audio/video packet further comprise instructions used for causing the stream pulling device to:

determine a maximum audio/video identifier of the acquired audio/video packets according to the audio/video packets of the acquired live streaming data stream to be processed;

determine whether the audio/video identifier of the one audio/video packet of the at least one audio/video packet is less than or equal to the maximum audio/video identifier of the acquired audio/video packets; and if the audio/video identifier of the one audio/video packet of the at least one audio/video packet is less than or equal to the maximum audio/video identifier of the acquired audio/video packets, determine that the acquired audio/video packets in the live streaming data stream to be processed comprise an audio/video packet having the same audio/video identifier as the audio/video identifier of the one audio/video packet of the at least one audio/video packet.

13. The stream pulling device according to claim 11, wherein the audio/video identifiers of the audio/video packets of the at least one audio/video packet monotonically increase according to the order of the audio/video packets of the at least one audio/video packet in the live streaming data stream to be processed;

the instructions used for causing the stream pulling device to determine whether the audio/video identifier of one audio/video packet of the at least one audio/video packet is an audio/video identifier that is reset after the audio/video identifiers of the audio/video packets in the live streaming data stream to be processed reach a preset end identifier comprise the instructions used for causing the stream pulling device to:

acquire the audio/video identifier of a first audio/video packet at an interval of a preset number of audio/video packets in a first preset direction from the one audio/video packet of the at least one audio/video packet in the live streaming data stream to be processed, and the audio/video identifier of a second audio/video packet at an interval of the preset number of audio/video packets in a second preset direction from one audio/video packet of the at least one audio/video packet in the live streaming data stream to be processed, wherein the second preset direction and the first preset direction are opposite; and if the audio/video identifier of the first audio/video packet is greater than or equal to the audio/video identifier of the second audio/video packet, determine that the audio/video identifier of the one audio/video packet of the at least one audio/video packet is an audio/video identifier that is reset after the audio/video identifiers of the audio/video packets in the live streaming data stream to be processed reach the preset end identifier.

14. The stream pulling device according to claim 9, wherein before the stream pulling device is cause to determine, according to the audio/video identifier of the one audio/video packet of the at least one audio/video packet, whether the one audio/video packet of the at least one audio/video packet is a repeatedly acquired audio/video packet, the instructions further comprise instructions used for causing the stream pulling device to:

determine whether the live streaming data stream to be processed is a new pushed stream; and the instructions used for causing the stream pulling device to determine, according to the audio/video identifier of the one audio/video packet of the at least one audio/video packet, whether the one audio/video packet of the at least one audio/video packet is a repeatedly acquired audio/video packet comprises instructions used for causing the stream pulling device to:

if the live streaming data stream to be processed is not a new pushed stream, determine, according to the audio/video identifier of one audio/video packet of the at least one audio/video packet, whether the one audio/video packet of the at least one audio/video packet is a repeatedly acquired audio/video packet.

15. The stream pulling device according to claim 14, wherein the live streaming data stream to be processed carries a stream pushing timestamp; and the instructions used for causing the stream pulling device to determine whether the live streaming data stream to be processed is a new pushed stream comprise instructions used for causing the stream pulling device to:

determine, according to the stream pushing timestamp, whether the stream pushing timestamp changes; and when it is determined that the stream pushing timestamp changes, determine that the live streaming data stream to be processed is a new pushed stream.

16. The stream pulling device according to claim 9, wherein before the stream pulling device is caused to determine, according to the audio/video identifier of the one audio/video packet of the at least one audio/video packet, whether the one audio/video packet of the at least one audio/video packet is a repeatedly acquired audio/video packet, the instructions further comprise instructions used for causing the stream pulling device to:

determine whether the audio/video identifier of the one audio/video packet of the at least one audio/video packet is empty; and the instructions used for causing the stream pulling device to determine, according to the one audio/video identifier of one audio/video packet of the at least one audio/video packet, whether the one audio/video packet of the at least one audio/video packet is a repeatedly acquired audio/video packet comprise instructions used for causing the stream pulling device to:

if the audio/video identifier of the one audio/video packet of the at least one audio/video packet is not empty, determine, according to the audio/video identifier of the one audio/video packet of the at least one audio/video packet, whether the audio/video packet of the at least one audio/video packet is a repeatedly acquired audio/video packet.

17. A computer program product, comprising computer instructions, wherein the computer instructions, when executed by a processor, to cause the processor to:

acquire a live streaming data stream to be processed, the live streaming data stream to be processed comprising at least one audio/video packet;

perform following operations on one audio/video packet of the at least one audio/video packet, wherein an audio/video packet of the at least one audio/video packet carries an audio/video identifier, and the audio/video identifier is determined according to an order of audio/video packets of the at least one audio/video packet in the live streaming data stream to be processed:

determine, according to the audio/video identifier of the one audio/video packet of the at least one audio/video packet, whether the one audio/video packet of the at least one audio/video packet is a repeatedly acquired audio/video packet;

when it is determined that the one audio/video packet of the at least one audio/video packet is not a repeatedly acquired audio/video packet, record the audio/video identifier of the one audio/video packet of the at least one audio/video packet, and remove the audio/video identifier of the one audio/video packet of the at least one audio/video packet after recording the audio/video identifier of the one audio/video packet of the at least one audio/video packet, so that a terminal performs audio/video playing based on the one audio/video packet of the at least one audio/video packet with the audio/video identifier removed; and when it is determined that the one audio/video packet of the at least one audio/video packet is a repeatedly acquired audio/video packet, discard the one audio/video packet of the at least one audio/video packet.

18. The computer program product according to claim 17, wherein instructions to cause the processor to determine whether the one audio/video packet of the at least one audio/video packet is a repeatedly acquired audio/video packet according to the audio/video identifier of the one of the at least one audio/video packet, comprise instructions to cause the processor to:

determine whether audio/video packets in the acquired live streaming data stream to be processed comprise an audio/video packet having the same audio/video identifier as the audio/video identifier of the one audio/video packet of the at least one audio/video packet; and when the audio/video packets in the acquired live streaming data stream to be processed comprise an audio/ video packet having the same audio/video identifier as the audio/video identifier of the one audio/video packet of the at least one audio/video packet, determine that the one audio/video packet of the at least one audio/video packet is a repeatedly acquired audio/video packet.

\*  \*  \*  \*  \*